United States Patent [19]
Miyazaki et al.

[11] Patent Number: 6,101,103
[45] Date of Patent: Aug. 8, 2000

[54] SELF-OSCILLATION TYPE SWITCHING POWER SUPPLY

[75] Inventors: Kengo Miyazaki; Yasunori Ijiri, both of Kyoto, Japan

[73] Assignee: Murata Manufacturing Co., Ltd., Japan

[21] Appl. No.: 09/170,967

[22] Filed: Oct. 13, 1998

[30] Foreign Application Priority Data

Oct. 17, 1997 [JP] Japan .................................. 9-285809

[51] Int. Cl.$^7$ .................................................. H02M 3/335
[52] U.S. Cl. .................................................. 363/19; 363/97
[58] Field of Search .................................. 363/21, 19, 20, 363/131, 95, 97

[56] References Cited

U.S. PATENT DOCUMENTS

| | | | |
|---|---|---|---|
| 4,443,838 | 4/1984 | Yamada | 363/19 |
| 4,862,338 | 8/1989 | Tanaka | 363/19 |
| 5,638,262 | 6/1997 | Brown | 363/21 |

FOREIGN PATENT DOCUMENTS

| | | |
|---|---|---|
| 60-170465 | 9/1985 | Japan . |
| 63-87170 | 4/1988 | Japan . |

*Primary Examiner*—Peter S. Wong
*Assistant Examiner*—Rajnikant B. Patel
*Attorney, Agent, or Firm*—Ostrolenk, Faber, Gerb & Soffen, LLP

[57] ABSTRACT

A self-oscillation type switching power supply comprises a transformer having a primary winding, a secondary winding, a feedback winding, and a control winding as necessary, a switching transistor interrupting a current in said primary winding, a control transistor controlling a positive feedback signal from said feedback winding to the switching transistor, and a time constant circuit charged by a starting voltage of said feedback winding or said control winding with a predetermined time constant and further applying a control voltage to said control transistor. The self-oscillation type switching power supply further comprises an impedance circuit which blocks a reverse bias from said feedback winding or said control winding to said control transistor, disposed between a control voltage input block to said control transistor and said time constant circuit.

18 Claims, 3 Drawing Sheets

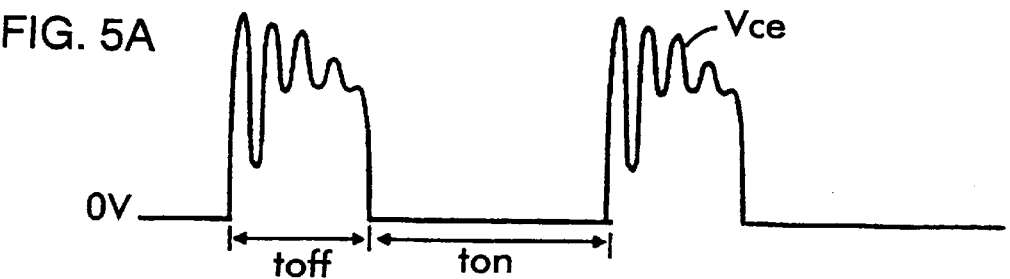
FIG. 5A
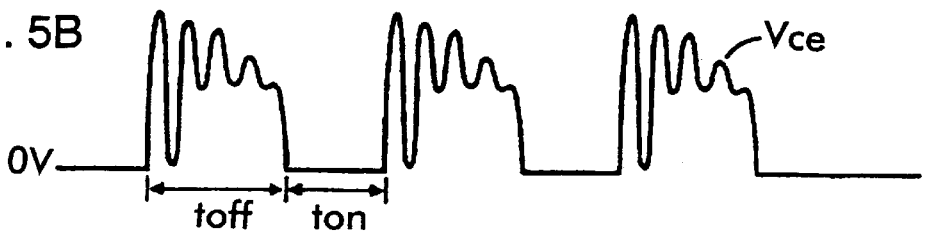
FIG. 5B
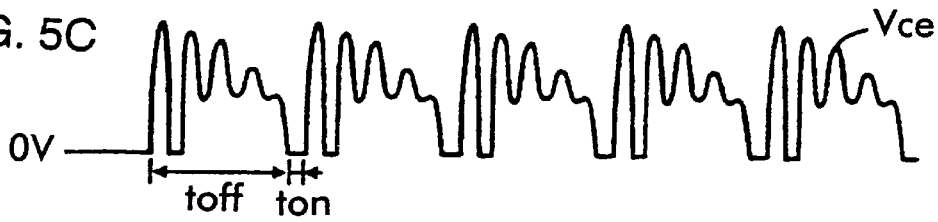
FIG. 5C
FIG. 6 PRIOR ART
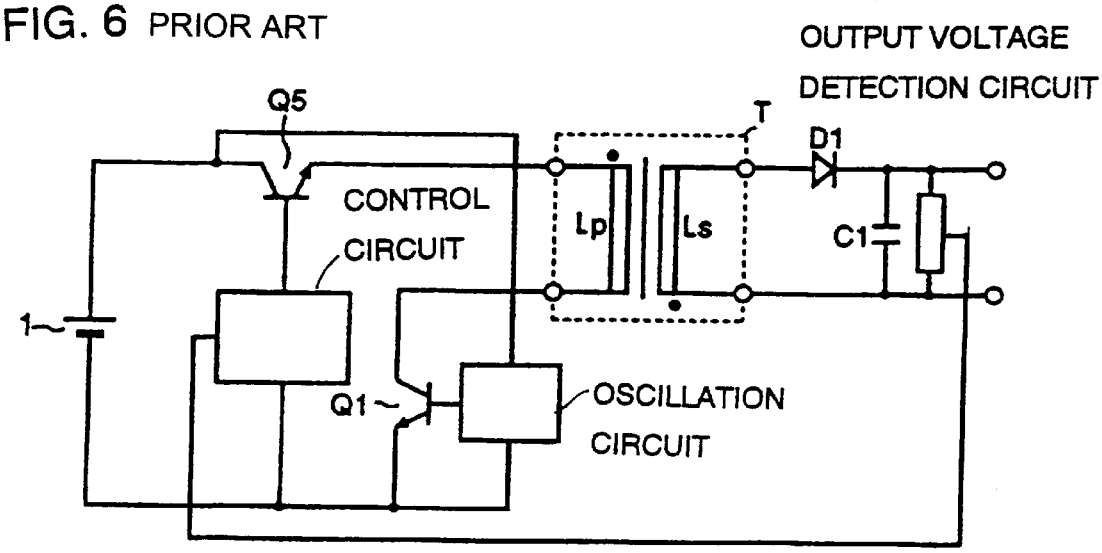

SELF-OSCILLATION TYPE SWITCHING POWER SUPPLY

BACKGROUND OF THE INVENTION

1. Field of the Invention

The present invention relates to a self-oscillation type switching power supply, and more particular to a switching power supply outputting a high voltage.

2. Description of the Related Art

Ringing-choke converters have been used as self-oscillation types switching power supplies. FIG. 2 is a circuit diagram of a conventional ringing choke converter. In the diagram, numeral 11 shows a direct current (hereinafter, DC) power circuit that rectifies and smoothes a commercial alternating-current (hereinafter, AC) power AC and generates a DC voltage of about 120 V, and symbol T is a transformer having a primary winding Lp, a secondary winding Ls, and a feedback winding Lf. Symbol Q1 shows a switching transistor that is connected to the DC power supply via the primary winding Lp of the transformer. A starting resistor R1 is connected to the base of this switching transistor Q1. A current limiting resistor R2, an accelerating capacitor C2, and a diode D2 are connected between the feedback winding Lf and base of the switching transistor Q1. In addition, a control transistor Q2 is connected between the base and emitter of the switching transistor Q1, and a time-constant circuit 4 comprising a resistor 5 and a capacitor C3 is provided in the feedback winding Lf. The time-constant circuit 4 is connected so that a voltage of the capacitor C3 may be applied to the base of the control transistor Q2. A rectifying and smoothing circuit 2 comprising a rectifier diode D1 and a smoothing capacitor C1 is connected to the secondary winding Ls of the transformer T. A resistor voltage-dividing circuit comprising resistors R3 and R4, a current limiting resistor R10, a variable shunt regulator 12, and a light emitting diode of a photocoupler PC are connected to the output side of this rectifying and smoothing circuit 2. A phototransistor of this photocoupler is connected to a charging path of the capacitor C3.

Operation of a power supply apparatus shown in FIG. 2 is as follows. When a DC voltage is applied from the DC power circuit 11, a minute starting current flows to the base of the switching transistor Q1 via the starting resistor R1. Owing to this, if a voltage between the collector and emitter between the switching transistor Q1 is decreased since a current flows in the collector of the transistor Q1, a voltage is applied between terminals of the primary winding Lp of the transformer T, and an induced voltage proportional to this voltage is generated in the feedback winding Lf. Since a positive feedback current is supplied to the base of the switching transistor Q1 via the current limiting resistor R2, accelerating capacitor C2, and diode D2, the transistor Q1 turns ON (saturated). If the transistor Q1 turns ON, a DC voltage is applied between terminals of the primary winding Lp of the transformer T, and a current flows in the primary winding Lp to excite the transformer T. At this time, an induced voltage generated simultaneously in the feedback winding Lf charges the capacitor C3 via the resistor R5 and accelerating capacitor C2, diode D2, and phototransistor of the photocoupler PC. If the charged voltage of the capacitor C3 reaches a threshold voltage (about 0.6 V) between the base and emitter of the control transistor Q2, the base and emitter of the switching transistor Q1 are short-circuited, and hence a base current of the switching transistor Q1 is cut off to cut out the transistor Q1 sharply. If the switching transistor Q1 goes OFF, the induced voltage of the feedback winding Lf reversely biases the base of the switching transistor Q1 to a negative potential. At the same time, the feedback winding Lf discharges the capacitor C3 via the resistor R5, and hence the base of the control transistor Q2 is reverse-biased at a negative potential. Therefore, an OFF period is continued until all the excited energy of the transformer T is released from the secondary winding Ls. If all the excited energy of the transformer T is released, the induced voltage of the feedback winding Lf abruptly disappears, but a ringing voltage (kick voltage) is generated in the direction where the base of the switching transistor Q1 is forward-biased by leakage inductance and distributed capacitance of the transformer T to turn on the switching transistor Q1 again. After that, oscillation grows and continues with repeating ON/OFF operation described above.

Here, let a voltage between both ends of the rectifying and smoothing circuit 2 be an output voltage Vout, let a current passing a load be Iout, let inductance of the primary winding Lp be Lp, and let the peak value of a collector current of the switching transistor Q1 be Icp, and the output voltage Vout can be approximated by the following formula:

$$\text{Vout} = (Lp \cdot Icp^2)/(2Iout) \tag{1}$$

In addition, let ON time of the switching transistor Q1 be ton, and let a voltage applied between terminals of the primary winding Lp be Vin, and the current Icp can be expressed by the following formula:

$$Icp = (Vin/Lp)\text{ton} \tag{2}$$

According to the relation expressed in formulas (1) and (2), it is possible to maintain the output voltage Vout to be constant by adjusting the current in the phototransistor of the photocoupler PC through detecting the output voltage and by controlling the ON time ton of the switching transistor Q1.

Nevertheless, in a conventional self-oscillation type switching power supply shown in FIG. 2, the output voltage Vout is a low voltage such as 5 V, and the transformer T is a step-down transformer. Although it becomes possible to configure at once a power supply apparatus generating a high voltage by increasing a turn ratio of the secondary winding Ls to the primary winding of the transformer T in the configuration of the conventional power supply apparatus shown in FIG. 2, problems arise, as discussed below.

FIG. 3 is a circuit diagram of a transformer, symbol Cs shows distributed capacitance generated between terminals of the secondary winding Ls, and Cps is other distributed capacitance generated between the primary winding Lp and secondary winding Ls. In addition, symbol Cpp shows capacitance into which the distributed capacitance Cs and Cps is converted as capacitance between terminals of the primary winding Lp. Although a power supply apparatus boosting a DC voltage input of some tens of volts to a DC or AC voltage of some hundreds through some thousands of volts is requested in, for example, an electrophotography type of copy machine or page printer, so as to obtain such a characteristic, it is necessary to extremely increase the turn ratio of the secondary winding Ls to the primary winding Lp in a high-voltage transformer. Here, let the number of turns of the primary winding Lp be Np, let the number of turns of the secondary winding Ls be Ns, and let values of the distributed capacitance Cs and Cps be Cs and Cps respectively, and the distributed capacitance Cpp into which the capacitance Cs and Cps are converted as the capacitance between terminals of the primary winding Lp can be approximated by the following formula:

$$Cpp=(Cs+Cps)\times(Ns/Np)^2 \qquad (3)$$

Therefore, in the high-voltage transformer, the capacitance Cpp becomes an excessively large value in comparison with the low voltage transformer. In addition, let inductance of the primary winding Lp be Lp, and an inherent parallel resonance frequency fo configured with the inductance Lp of the primary winding and the primary side-converted capacitance Cpp is expressed by the following formula:

$$fo=1/(2\pi(Lp\cdot Cpp)^{1/2}) \qquad (4)$$

Based on this formula, the above-described resonance frequency fo in the high-voltage transformer is a lower frequency in comparison with that in the low voltage transformer.

Then, a point largely different from the above-described operation in the case that the transformer in FIG. 2 is replaced with the high-voltage transformer shown in FIG. 3 is that the high-voltage transformer freely oscillates at the resonance frequency fo determined by formula (4) during a period from the switching transistor Q1 turning off to when it next turns off. In the conventional low voltage switching power supply shown in FIG. 2, an oscillation frequency largely changes according to output power consumption. For example, as the output power consumption becomes small, the low voltage transformer T can be excited in further minute ON time, and in consequence, the oscillation frequency is apt to increase. Since the low voltage transformer T has excessively small capacitance Cpp shown in formula (3) and a high inherent resonance frequency, the low voltage transformer T can oscillate in the frequency range of some hundreds of kHz, but, in the high-voltage transformer, it becomes difficult to oscillate at a frequency higher than the inherent frequency even in the case of the output power consumption being in the state of no load since the inherent resonance frequency fo, as described above, is very low.

FIG. 4 is an equivalent circuit of a circuit of the high-voltage transformer shown in FIG. 3 and the switching transistor. Here, symbols L1 and L2 show leakage inductance, Lp is the excited inductance of the primary winding, and Cpp is the primary side-converted distributed capacitance shown in FIG. 12. Here, let an inductance component of the leakage inductance L1 and L2 be $L_{1e}$, and a serial resonance frequency fo' is expressed by the following formula:

$$fo'=1/(2\pi\sqrt{(L_{1e}\cdot Cpp)}) \qquad (5)$$

As described above, since the primary side-converted capacitance Cpp is extremely large in the high-voltage transformer, the serial resonance frequency fo' shown in formula (5) also becomes comparatively low. Although the serial resonance frequency fo' depends on a value of the leakage inductance $L_{1e}$, as an order, the resonance frequency fo' becomes a frequency component that is generally about 6–10 times the parallel resonance frequency expressed by formula (4), that is, near to it. Therefore, if such a high-voltage transformer is applied to the circuit shown in FIG. 2, a ringing component is superimposed on a voltage Vce between the collector and emitter of the switching transistor Q1, as shown in FIGS. 5A to 5C.

In addition, although a wide range of variable performance on an output voltage (current) is requested in a high voltage power supply apparatus, if the ON time of the switching transistor Q1 is adjusted so as to change in a wide range a voltage induced between the secondary winding Ls of the high-voltage transformer, the OFF time of the switching transistor Q1, as described above, is determined by the parallel resonance frequency fo, and hence toff≈1/(2fo), that is, toff is constant. On the other hand, although the frequency of a ringing component is fo' that is shown in formula (5) and is constant, the leakage inductance $L_{1e}$, is an extremely small value in comparison with the inductance Lp of the primary winding, and hence, even if the ON time of the switching transistor Q1 is changed, the amplitude of the ringing component is changed to not so large an extent. Therefore, as the ON time of the switching transistor Q1 becomes short since the voltage between the collector and emitter of the switching transistor Q1 is changed as shown in FIGS. 5A to 5C, the serial resonance frequency component shown in formula (5) becomes dominant.

According to the conventional circuit shown in FIG. 2, its construction is that a voltage induced in the feedback winding Lf discharges the capacitor C3 and a voltage induced in the feedback winding Lf and a current of the phototransistor of the photocoupler PC charges the capacitor C3, and hence, if the ON time ton of the switching transistor Q1, as shown in FIG. 5C, becomes near to the period 1/(2fo') to which the frequency of the ringing component is determined, the time ton follows the serial resonance frequency fo' since the time constant circuit 4 comprises passive elements, and in consequence, the control transistor Q2 also follows the serial resonance frequency for the switching transistor Q1 to reach the serial resonance operation, not the parallel oscillation in which the switching transistor Q1 should operate. Owing to this, the relation between the ON time of the switching transistor Q1 and the output voltage Vout becomes non-linear, circuit operation becomes unstable like intermittent oscillation, and hence stable control cannot be performed. Furthermore, since switching loss increases by the switching transistor Q1 turning on/off at a high frequency, upsizing of a heat sink becomes necessary.

In order to solve the above-described problems, the ON time of the switching transistor Q1, as shown in FIG. 6, is not adjusted in a conventional high voltage power supply apparatus, but it is common that the DC input voltage inputted to the primary winding of the high-voltage transformer is adjusted to stabilize its output. In FIG. 6, symbol Q5 shows a control power transistor for performing step-down of a voltage of a DC input power supply 1 and thereby adjusting an input voltage to the high-voltage transformer. A control circuit controls a base current of the transistor Q5 according to a detection signal from an output voltage detection circuit to stabilize an output voltage. The switching transistor Q1 always performs ON/OFF operation in a constant period by an oscillation circuit.

Nevertheless, since the circuit shown in FIG. 6 is configured in a separately-excited oscillation type switching power supply, an external oscillator becomes necessary. Further, another power transistor for performing step-down of the input voltage to the high-voltage transformer becomes necessary, and hence the circuit configuration becomes complicated and large.

SUMMARY OF THE INVENTION

An object of the present invention is to solve the above problems, that is, to provide a power supply apparatus that is a self-oscillation type switching power supply using a high-voltage transformer and corresponds to a wide range of load fluctuation or changes an output voltage (current) over a wide range.

Another object of the present invention is to solve the problem caused by a switching transistor reaching the above-described serial resonance operation and thereby to suppress increase of switching loss.

In a self-oscillation type switching power supply comprising a transformer having a primary winding, a secondary winding, a feedback winding, and a control winding as necessary, a switching transistor interrupting a current of the primary winding, a control transistor controlling a positive feedback signal from the feedback winding to the switching transistor, and a time constant circuit charging a starting voltage of the feedback winding or control winding with a predetermined time constant and further applying a control voltage to the control transistor, the present invention provides an impedance circuit, blocking a reverse bias from the feedback winding or control winding to the control transistor, disposed between a control voltage input to the control transistor and the time constant circuit so as to prevent the serial resonance caused by the distributed capacitance and leakage inductance of the transformer.

Owing to this, the reverse bias from the feedback winding or control winding to the control transistor is blocked, high-frequency response of the control transistor is lowered, and high-frequency operation of the switching transistor is prevented. Therefore, it becomes possible to change the output voltage (current) in a stable state over a wide range, and also to prevent increase of the switching loss caused by the high-frequency oscillation state of the switching transistor.

For the purpose of illustrating the invention, there is shown in the drawings several forms which are presently preferred, it being understood, however, that the invention is not limited to the precise arrangements and instrumentalities shown.

Other features and advantages of the present invention will become apparent from the following description of the invention which refers to the accompanying drawings.

BRIEF DESCRIPTION OF THE DRAWINGS

FIGS. 5A to 5C are charts showing changes of waveforms of the voltage between the collector and emitter of a switching transistor together with changes of the ON period of the switching transistor.

FIG. 6 is a diagram showing the configuration of a conventional high-voltage switching power supply.

DETAILED DESCRIPTION OF EMBODIMENTS OF THE INVENTION

Hereinafter, the preferred embodiments of the present invention are explained in detail with reference to the drawings.

Figure 1:
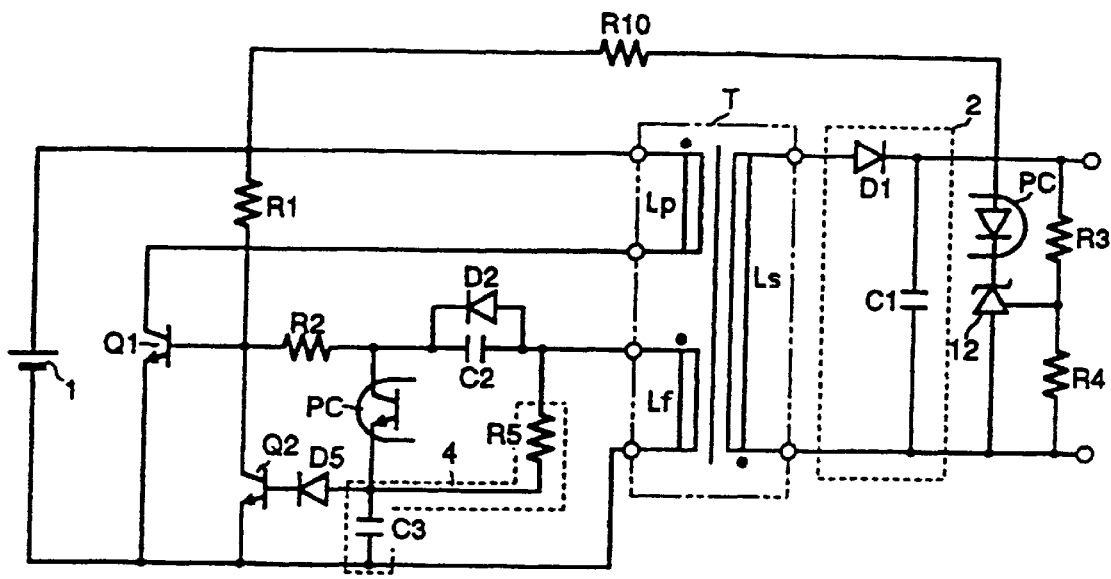
FIG. 1 is a circuit diagram showing a constructive example of a self-oscillation type switching power supply according to a first embodiment.
Figure 2:
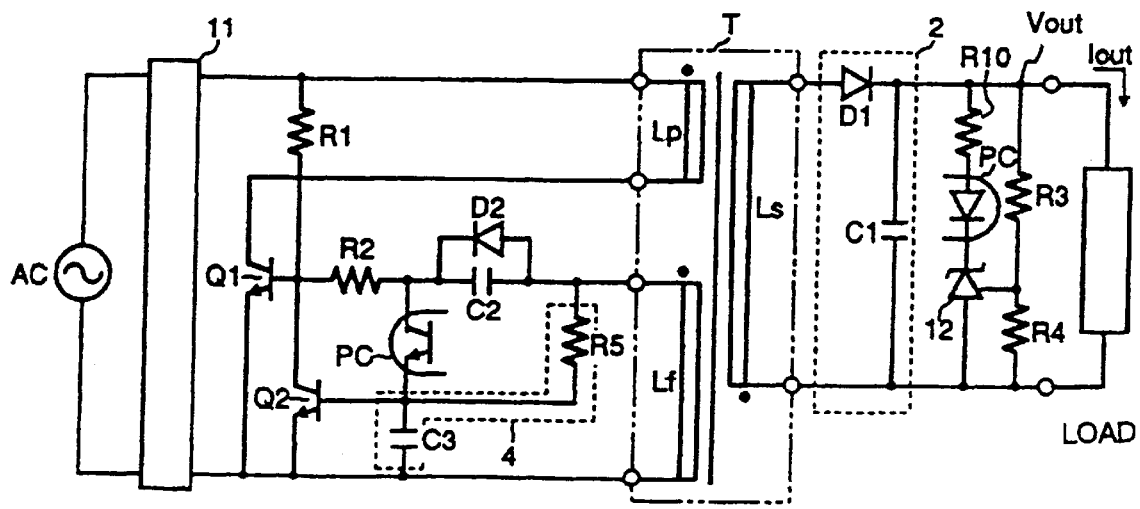
FIG. 2 is a circuit diagram of a conventional self-oscillation type switching power supply.
Figure 3:
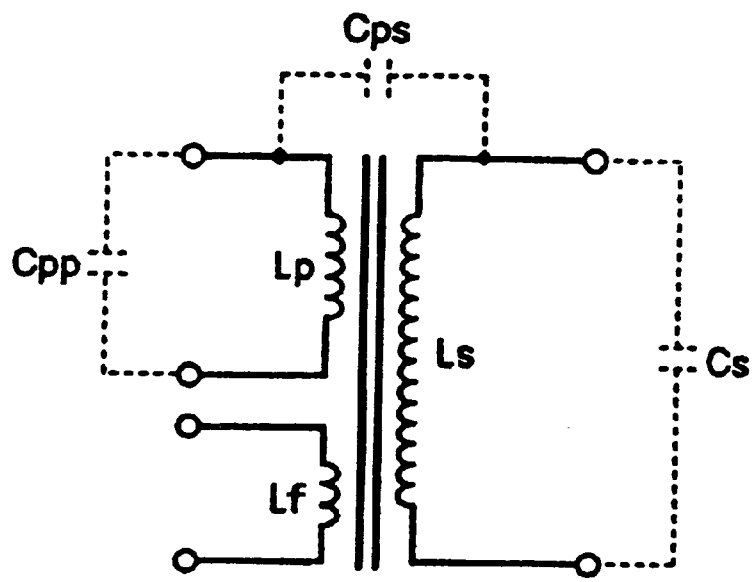
FIG. 3 is a circuit diagram of a transformer block.
Figure 4:
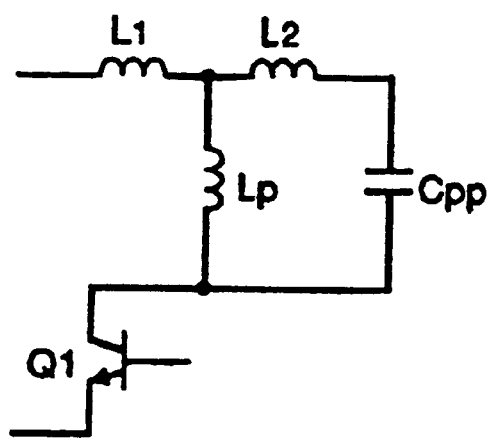
FIG. 4 is an equivalent circuit diagram of a transformer and switching transistor block.

FIG. 1 is a circuit diagram of a self-oscillation type switching power supply according to a first embodiment of the present invention. In the diagram, numeral 1 shows an input power supply and D5 is a diode connected between a capacitor C3 of a time constant circuit 4 and the base of a control transistor Q2. Diode D5 comprises an impedance circuit according to the present invention. Here, a transformer T is a high-voltage transformer, and, since a voltage induced in its secondary winding is high, a source voltage is supplied from the primary side of the power supply to a light emitting diode of a photocoupler PC via a current limiting resistor R10. The remaining structure is the same as that shown in FIG. 2.

Operation of the circuit shown in FIG. 1 is as follows. When a DC voltage is applied from an input power supply 1, a minute current flows in the base of the switching transistor Q1 via a starting resistor R1. When, owing to this, a current flows in the collector of the transistor Q1 and thereby a voltage between the collector and emitter is lowered, a voltage is applied between terminals of a primary winding Lp of the high-voltage transformer T and an induced voltage proportional to this voltage is generated in a feedback winding Lf. Owing to this induced voltage, a positive feedback current is supplied to the base of the switching transistor Q1 via the current limiting resistor R2, an accelerating capacitor C2 and a diode D2, and thereby the transistor Q1 turns ON (saturates). When the transistor Q1 turns ON, a DC voltage is applied between terminals of the primary winding Lp of the high-voltage transformer T, and a current flows in the primary winding Lp and excites the high-voltage transformer T. At this time, an induced voltage generated simultaneously in the feedback winding Lf charges the capacitor C3 via the resistor R5 and accelerating capacitor C2, diode D2, and phototransistor of the photocoupler PC. Here, let a forward voltage of the diode D5 be Vf (about 0.6 V) and let a threshold voltage of a voltage between the base and emitter of the control transistor Q2 be Vbe (about 0.6 V), and when the charged voltage of the capacitor C3 reaches (Vf+Vbe), the control transistor Q2 short-circuits the base and emitter of the switching transistor Q1, and hence a base current of the switching transistor Q1 is cut off to cut off transistor Q1 rapidly. When the switching transistor Q1 turns OFF, the induced voltage of the feedback winding Lf reversely biases the base of the switching transistor Q1 to a negative potential. At the same time, the feedback winding Lf discharges the capacitor C3 via the resistor R5, and hence the switching transistor Q1 is kept OFF. Since, during the OFF time of the transistor Q1, the high-voltage transformer T freely oscillates at a resonance frequency, a voltage is generated in the feedback winding in the direction where the base of the switching transistor Q1 is forward-biased, and thereby the switching transistor Q1 turns ON again. After that, oscillation grows and continues with repeating ON/OFF operation described above.

Now, considering the case of the output voltage increasing, a collector current flowing in the phototransistor of the photocoupler PC increases, and hence a voltage increase ratio of the capacitor C3 increases for charging-time constant to decrease. Due to this, the ON time of the switching transistor Q1 becomes short. Thus, the switching transistor Q1 turns on and a positive feedback signal is generated from the feedback winding Lf. Thereafter, the control transistor Q2 turns on after a short time, and the switching transistor Q1 turns off. On the contrary, if the output voltage decreases, an operation the reverse of the above-described operation is performed, that is, the charging time constant increases, and the ON time of the switching transistor Q1 becomes long. In this manner, the output voltage is stabilized.

Now, when the switching transistor Q1 shown in FIG. 1 turns OFF, the feedback winding Lf attempts to reversely bias the base of the control transistor Q2, but since the diode D5 is provided between the control transistor Q2 and capacitor C3, a reverse-biasing current from the feedback winding Lf to the control transistor Q2 due to turning off of the switching transistor Q1 is blocked by this diode D5. For this reason, high-frequency-following operation of the control transistor Q2 is prevented by a carrier storage effect of the transistor Q2, and hence the upper limit of the oscillation frequency of the switching transistor Q1 is limited. Thus, when the control transistor Q2 transfers from the ON state to the OFF state, a time of some hundreds of ns to several $\mu$s (generally, the time corresponding to the storage time $t_{stg}$ and collector current fall time tf defined in transistor ratings) is necessary until carriers stored between the base and emitter disappear. Since, during this period, the control transistor Q2 continues to short-circuit the base and emitter of the switching transistor Q1, the switching transistor Q1 cannot turn on even if such a voltage that forward-biases the switching transistor Q1 is induced in the feedback winding Lf. Therefore, the control transistor Q2 cannot follow the ON/OFF operation at the high-frequency equal to or higher than some frequency and cannot continue oscillation at the serial resonance frequency fo' expressed in formula (5), and hence the oscillation frequency is limited. Due to this, it becomes possible to operate this circuit so that the parallel resonance frequency fo at which the oscillation state at the time of a low output voltage or light load as expressed in formula (4) may become dominant. In consequence, since unstable operation such as intermittent operation is prevented, it becomes possible to stably control the output voltage (current) over a wide range.

In addition, although, in the above-described embodiment, a bipolar transistor is used as each transistor, a unipolar transistor can be used as each transistor.

Furthermore, although, in the above-described embodiment, a diode is used as an impedance circuit, similar effects can be obtained if a Zener diode is used.

Moreover, it is also good to connect an adjusting circuit comprising, for example, a resistor between the base and emitter of the control transistor Q2 in FIG. 1. Due to this, it becomes possible to adjust an impedance between the base and emitter of the control transistor Q2 and to finely adjust the carrier storage effect of the transistor Q2, and hence it becomes possible to finely adjust the OFF state-holding time of the switching transistor Q1 caused by the control transistor Q2 turning on and to obtain a stable OFF state-holding time of the switching transistor Q1.

In addition, similar effects can be obtained even if a control winding having a polarity the same as that of the feedback winding is provided in the high-voltage transformer T in FIG. 1, the time constant circuit 4 is connected between the terminals of the control winding, and this circuit is operated.

Furthermore, similar effects can be obtained even if a control winding having a polarity reverse to that of the feedback winding is provided in the high-voltage transformer T, the time constant circuit 4 is connected between the terminals of the control winding, and a PNP transistor is used as the control transistor Q2.

Moreover, although, in the above-described embodiment, a power circuit outputting a constant voltage is shown, the present invention can be applied also to a power circuit outputting a constant current by configuring a circuit performing feedback control through detecting an output current.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claim is:

1. A self-oscillation type switching power supply comprising a transformer having a primary winding, a secondary winding and at least one control winding, a switching transistor interrupting a current flowing in said primary winding, a control transistor controlling a feedback signal from said at least one control winding to the switching transistor, and a time constant circuit charged by a starting voltage of said at least one control winding and further wherein the time constant circuit applies a control voltage to said control transistor, and further comprising an impedance circuit blocking a reverse bias from said at least one control winding to said control transistor, the impedance circuit disposed between a control voltage input to said control transistor and said time constant circuit.

2. The power supply of claim 1, wherein the impedance circuit comprises a diode.

3. The power supply of claim 1, wherein the time constant circuit comprises a resistor in series with a capacitor, a common connection of the resistor and capacitor coupled to said impedance circuit.

4. The power supply of claim 3, further comprising a shunt regulator coupled across a primary side of said transformer in series with a current limiting resistor and an isolating control circuit.

5. The power supply of claim 4, further comprising an electronic switch coupled to said capacitor and controlling charging of said capacitor.

6. The power supply of claim 5, wherein the electronic switch is controlled by the isolating control circuit coupled to the shunt regulator.

7. A self-oscillation type switching power supply comprising a transformer having a primary winding, a secondary winding and a feedback winding, a switching transistor interrupting a current flowing in said primary winding, a control transistor controlling a feedback signal from said feedback winding to the switching transistor, and a time constant circuit charged by a starting voltage of said feedback winding and further wherein the time constant circuit applies a control voltage to said control transistor, and further comprising an impedance circuit blocking a reverse bias from said feedback winding to said control transistor, the impedance circuit disposed between a control voltage input to said control transistor and said time constant circuit.

8. The power supply of claim 7, wherein the impedance circuit comprises a diode.

9. The power supply of claim 7, wherein the time constant circuit comprises a resistor in series with a capacitor, a common connection of the resistor and capacitor coupled to said impedance circuit.

10. The power supply of claim 9, further comprising a shunt regulator coupled across a primary side of said transformer in series with a current limiting resistor and an isolating control circuit.

11. The power supply of claim 10, further comprising an electronic switch coupled to said capacitor and controlling charging of said capacitor.

12. The power supply of claim 11, wherein the electronic switch is controlled by the isolating control circuit coupled to the shunt regulator.

13. A self-oscillation type switching power supply comprising a transformer having a primary winding, a secondary winding and a feedback winding, a switching transistor interrupting a current flowing in said primary winding, a control transistor controlling a positive feedback signal from said feedback winding to the switching transistor, and a time constant circuit charged by a starting voltage of said feedback winding with a predetermined time constant and further wherein the time constant circuit applies a control voltage to said control transistor, and further comprising an impedance circuit blocking a reverse bias from said feedback winding to said control transistor, the impedance circuit disposed between a control voltage input to said control transistor and said time constant circuit.

14. The power supply of claim 13, wherein the impedance circuit comprises a diode.

15. The power supply of claim 13, wherein the time constant circuit comprises a resistor in series with a capacitor, a common connection of the resistor and capacitor coupled to said impedance circuit.

16. The power supply of claim 15, further comprising a shunt regulator coupled across a primary side of said transformer in series with a current limiting resistor and an isolating control circuit.

17. The power supply of claim 16, further comprising an electronic switch coupled to said capacitor and controlling charging of said capacitor.

18. The power supply of claim 17, wherein the electronic switch is controlled by the isolating control circuit coupled to the shunt regulator.

\* \* \* \* \*